United States Patent
Lage et al.

(10) Patent No.: US 9,221,713 B2
(45) Date of Patent: Dec. 29, 2015

(54) COATED ARTICLE WITH LOW-E COATING HAVING BARRIER LAYER SYSTEM(S) INCLUDING MULTIPLE DIELECTRIC LAYERS, AND/OR METHODS OF MAKING THE SAME

(75) Inventors: Herbert Lage, Luxembourg (LU); Jose Ferreira, Rumelange (LU); Pierre Pallotta, Villerupt (FR)

(73) Assignee: Centre Luxembourgeois de Recherches pour le Verre et la Ceramique S.A. (C.R.V.C.), Grand Duche de Luxembourg (LU)

( * ) Notice: Subject to any disclaimer, the term of this patent is extended or adjusted under 35 U.S.C. 154(b) by 1042 days.

(21) Appl. No.: 13/333,069

(22) Filed: Dec. 21, 2011

(65) Prior Publication Data
US 2013/0164464 A1   Jun. 27, 2013

(51) Int. Cl.
E06B 3/66 (2006.01)
C03C 17/36 (2006.01)
E06B 3/67 (2006.01)

(52) U.S. Cl.
CPC ........... *C03C 17/3618* (2013.01); *C03C 17/36* (2013.01); *C03C 17/366* (2013.01); *C03C 17/3626* (2013.01); *C03C 17/3644* (2013.01); *C03C 17/3681* (2013.01); *E06B 3/66* (2013.01); *E06B 3/6715* (2013.01); *Y10T 428/2495* (2015.01)

(58) Field of Classification Search
CPC ......... E06B 3/66; E06B 3/6715; C03C 17/36; C03C 17/3618; C03C 17/3626; C03C 17/366; C03C 17/2681; C03C 17/3644; C03C 2217/211; C03C 2217/212; C03C 2217/213; C03C 2217/216; C03C 2217/219; C03C 2217/228; C03C 2217/256
See application file for complete search history.

(56) References Cited

U.S. PATENT DOCUMENTS

| | | | |
|---|---|---|---|
| 5,413,864 A | 5/1995 | Miyazaki et al. |
| 5,514,476 A | 5/1996 | Hartig et al. |
| 5,657,607 A | 8/1997 | Collins et al. |
| 5,664,395 A | 9/1997 | Collins et al. |
| 5,784,853 A | 7/1998 | Hood et al. |

(Continued)

FOREIGN PATENT DOCUMENTS

WO    WO 2005/003049    1/2005

OTHER PUBLICATIONS

U.S. Appl. No. 13/324,267, filed Dec. 13, 2011; Frank et al.

(Continued)

*Primary Examiner* — Donald J Loney
(74) *Attorney, Agent, or Firm* — Nixon & Vanderhye P.C.

(57) ABSTRACT

Certain example embodiments of this invention relate to coated articles with low-E coatings having one or more barrier layer systems including multiple dielectric layers, and/or methods of making the same. In certain example embodiments, providing barrier layer systems that each include three or more adjacent dielectric layers advantageously increases layer quality, mechanical durability, corrosion resistance, and/or thermal stability, e.g., by virtue of the increased number of interfaces. These barrier layer systems may be provided above and/or below an infrared (IR) reflecting layer in the low-E coating in different embodiments. Coated articles according to certain example embodiments of this invention may be used in the context of insulating glass (IG) window units, vehicle windows, other types of windows, or in any other suitable application.

21 Claims, 2 Drawing Sheets

(56) References Cited

U.S. PATENT DOCUMENTS

| | | |
|---|---|---|
| 5,800,933 A | 9/1998 | Hartig et al. |
| 5,902,652 A | 5/1999 | Collins et al. |
| 6,014,872 A | 1/2000 | Hartig et al. |
| 6,632,491 B1 | 10/2003 | Thomsen et al. |
| 7,166,359 B2 | 1/2007 | Kriltz et al. |
| 7,189,458 B2 | 3/2007 | Ferreira et al. |
| 7,198,851 B2 | 4/2007 | Lemmer et al. |
| 7,419,725 B2 | 9/2008 | Neuman et al. |
| 7,455,910 B2 | 11/2008 | Stachowiak |
| 7,521,096 B2 | 4/2009 | Lemmer et al. |
| 7,648,769 B2 | 1/2010 | Blacker et al. |
| 7,771,571 B2 | 8/2010 | Laird et al. |
| 7,858,191 B2 | 12/2010 | Lemmer et al. |
| 7,964,284 B2 | 6/2011 | Blacker et al. |
| 8,017,243 B2 | 9/2011 | Blacker et al. |
| 8,025,941 B2 | 9/2011 | Taylor et al. |
| 2004/0086723 A1* | 5/2004 | Thomsen et al. ............ 428/426 |
| 2007/0036986 A1 | 2/2007 | Chonlamaitri et al. |
| 2007/0036990 A1 | 2/2007 | Dietrich et al. |
| 2007/0128449 A1 | 6/2007 | Taylor et al. |
| 2007/0128451 A1 | 6/2007 | Ferreira et al. |
| 2009/0205956 A1 | 8/2009 | Lu et al. |
| 2009/0263596 A1 | 10/2009 | Lao et al. |
| 2009/0324967 A1 | 12/2009 | Disteldorf et al. |
| 2010/0075155 A1 | 3/2010 | Veerasamy |
| 2010/0279144 A1 | 11/2010 | Frank et al. |
| 2010/0295330 A1 | 11/2010 | Ferreira et al. |
| 2011/0097590 A1 | 4/2011 | Lemmer et al. |
| 2011/0117371 A1 | 5/2011 | Nunez-Regueiro et al. |
| 2011/0210656 A1 | 9/2011 | Lemmer et al. |
| 2011/0212311 A1 | 9/2011 | Lemmer et al. |
| 2011/0262726 A1 | 10/2011 | Knoll et al. |

OTHER PUBLICATIONS

U.S. Appl. No. 13/064,066, filed Mar. 3, 2011; Frank et al.
U.S. Appl. No. 13/183,833, filed Jul. 15, 2011; Benito et al.
U.S. Appl. No. 13/317,176, filed Oct. 12, 2011; O'Connor et al.

* cited by examiner

COATED ARTICLE WITH LOW-E COATING HAVING BARRIER LAYER SYSTEM(S) INCLUDING MULTIPLE DIELECTRIC LAYERS, AND/OR METHODS OF MAKING THE SAME

FIELD OF THE INVENTION

Certain example embodiments of this invention relate to coated articles including low-E coatings, and/or methods of making the same. More particularly, certain example embodiments relate to coated articles with low-E coatings having one or more barrier layer systems including multiple dielectric layers, and/or methods of making the same. In certain example embodiments, providing barrier layer systems including multiple dielectric layers advantageously increases layer quality, mechanical durability, corrosion resistance, and/or thermal stability. Coated articles according to certain example embodiments of this invention may be used in the context of insulating glass (IG) window units, vehicle windows, other types of windows, or in any other suitable application.

BACKGROUND AND SUMMARY OF EXAMPLE EMBODIMENTS OF THE INVENTION

Coated articles are known in the art for use in window applications such as insulating glass (IG) window units, vehicle windows, and/or the like. It is known that in certain instances, it is desirable to heat treat (e.g., thermally temper, heat bend and/or heat strengthen) such coated articles for purposes of tempering, bending, or the like in certain example instances.

In certain situations, designers of coated articles often strive for a combination of good selectivity, desirable visible transmission, low emissivity (or emittance), and low sheet resistance ($R_s$). Low-emissivity (low-E) and low sheet resistance characteristics permit such coated articles to block significant amounts of IR radiation so as to reduce for example undesirable heating of vehicle or building interiors.

Coated articles oftentimes are located in harsh environments such as, for example, severe cold, extreme heat and/or humidity, etc. Low-E coatings oftentimes include silver-based layers, and these silver-based layers are subject to corrosion or other forms of damage when located in harsh environments.

It is known to use dielectric thin film layers including materials such as, for example, zirconium oxide, silicon nitride, and the like to help protect against environmental conditions. Unfortunately, however, there oftentimes is a challenge to balance durability with desired optical properties (including, for example, visible transmission, reflection, color, etc.).

One common approach is to use bottom-most and upper-most layers in a thin film layer stack for durability purposes. For instance, a bottom-most layer comprising silicon nitride may help reduce the occurrence of sodium migration from the underlying substrate into the layer stack, and an upper-most layer comprising zirconium oxide may help provide scratch resistance. Other dielectric layers above and/or below the silver-based layer oftentimes are used in an effort to achieve the desired optical properties.

While this approach is oftentimes acceptable, those skilled in the art constantly seek more and more durable coatings for use in a wider array of possible environments, e.g., with desired optical properties.

One aspect of certain example embodiments relates to the inventors' discovery that increasing the number of interfaces in a layer stack promotes durability and corrosion resistance. For instance, increasing the number of layers in a dielectric layer stack from two to three or more with the total thickness of the dielectric layers being kept substantially the same has been found to result in superior durability. As one example, corrosion performance increased twofold.

Another aspect of certain example embodiments relates to the combination of three or more dielectrics directly adjacent to one another, with each generally being a metal reacted with oxygen and/or nitrogen, in the form $M_xR1_yR2_z$ where M is the metal and R1 and R2 the reactive gases, and with each layer including, for example: tin oxide (e.g., $SnO_2$ or other suitable stoichiometry), silicon nitride (e.g., $Si_3N_4$ or other suitable stoichiometry), titanium oxide (e.g., $TiO_2$ or other suitable stoichiometry), zirconium oxide (e.g., $ZrO_2$ or other suitable stoichiometry), zinc oxide (e.g., $ZnO_2$ or other suitable stoichiometry), zinc aluminum oxide (e.g., $ZnAl_xO_y$ or other suitable stoichiometry), silicon oxynitride (e.g., SiOxNy), etc. Such layer stacks may include, in order moving away from the substrate, for example: $Si_xN_y/TiO_2/ZnO_2/TiO_2/ZnO_2$; or $SnO_2/ZnO_2/Si_xN_y/ZrO_2$; or $Si_xN_y/TiO_2/ZnO_2/SnO_2/ZnO_2$. One or more of these layer stacks may be incorporated above and/or below an IR reflecting (e.g., silver-based) layer in certain example embodiments.

In certain example embodiments of this invention, there is provided a heat treatable coated article, comprising a multilayer thin film coating supported by a glass substrate. The coating comprises, in order moving away from the substrate: a first silicon-based layer; a first dielectric layer; a second dielectric layer split by a third dielectric layer so as to form first and second portions of the second dielectric layer; a metallic or substantially metallic infrared (IR) reflecting layer over and directly contacting the second portion of the second dielectric layer; an upper contact layer comprising an oxide of Ni and/or Cr directly over and contacting the IR reflecting layer; a fourth dielectric layer; and a second silicon-based layer. The third dielectric layer comprises either titanium oxide or tin oxide.

In certain example embodiments of this invention, there is provided a method of making a heat treatable coated article comprising a multilayer thin film coating supported by a glass substrate. A first silicon-based layer is disposed on the glass substrate. A first dielectric layer is disposed, directly or indirectly, on the first silicon-based layer. The method further includes starting to dispose a second dielectric layer, directly or indirectly, on the first dielectric layer; interrupting the disposing of the second dielectric layer and disposing a third dielectric layer; and resuming the disposing of the second dielectric layer on the third dielectric layer, such that the interruption and resumption in the disposing of the second dielectric layer results in the formation of first and second portions of the second dielectric layer, with each said portion being substantially homogenous and amorphous. A metallic or substantially metallic infrared (IR) reflecting layer is disposed directly over and contacting the second portion of the second dielectric layer. An upper contact layer comprising an oxide of Ni and/or Cr is disposed directly over and contacting the IR reflecting layer. A fourth dielectric layer is disposed, directly or indirectly, on the upper contact layer. A second silicon-based layer is disposed, directly or indirectly, on the fourth dielectric layer. The third dielectric layer comprises either titanium oxide or tin oxide.

According to certain example embodiments, the first and second silicon-based layers each comprise silicon nitride, the first dielectric layer comprises titanium oxide, the second dielectric layer comprises zinc oxide, the third and fourth dielectric layers each comprise tin oxide, and the IR reflecting layer comprises Ag. In certain of these example embodiments, the second layer is split such that the parts thereof have thicknesses that vary by no more than 5% of one another.

According to certain example embodiments, a fifth dielectric layer is interposed between the fourth dielectric layer and the second silicon-based layer. The first and third dielectric layers each comprise titanium oxide, and the second and fifth dielectric layers each comprise zinc oxide. The two portions of the split second dielectric layer and the fifth dielectric layer each have thicknesses that vary from one another by no more than 5%, and the first and third dielectric layers have thicknesses that vary from one another by no more than 5%. Thicknesses here and elsewhere may be varied, however, based on deposition conditions, desired properties, etc.

According to certain example embodiments, a topcoat comprising zirconium oxide may be provided, e.g., as an outermost layer of the coated article.

According to certain example embodiments, the coated article may be heat treated.

According to certain example embodiments, each layer may be formed via sputtering in a reactive environment of oxygen and/or nitrogen.

The above-described and/or other coated articles may be included in insulating glass (IG) units in certain example embodiments. Certain example embodiments relate to such IG units, and/or methods of making the same.

The features, aspects, advantages, and example embodiments described herein may be combined to realize yet further embodiments.

BRIEF DESCRIPTION OF THE DRAWINGS

These and other features and advantages may be better and more completely understood by reference to the following detailed description of exemplary illustrative embodiments in conjunction with the drawings, of which.

DETAILED DESCRIPTION OF EXAMPLE EMBODIMENTS OF THE INVENTION

Coated articles herein may be used in applications such as IG window units, vehicle windows, monolithic architectural windows, residential windows, and/or any other suitable application that includes single or multiple glass substrates.

In certain example embodiments of this invention, the coating includes a single-silver stack, although this invention is not so limited in all instances. For instance, other example embodiments may include double-, triple-, or quadruple silver layer stacks.

The terms "heat treatment" and "heat treating" as used herein mean heating the article to a temperature sufficient to achieve thermal tempering, heat bending, and/or heat strengthening of the glass inclusive article. This definition includes, for example, heating a coated article in an oven or furnace at a temperature of least about 580 degrees C., more preferably at least about 600 degrees C., for a sufficient period to allow tempering, bending, and/or heat strengthening. In certain instances, the HT may be for at least about 4 or 5 minutes. The coated article may or may not be heat treated in different embodiments of this invention.

Figure 1:
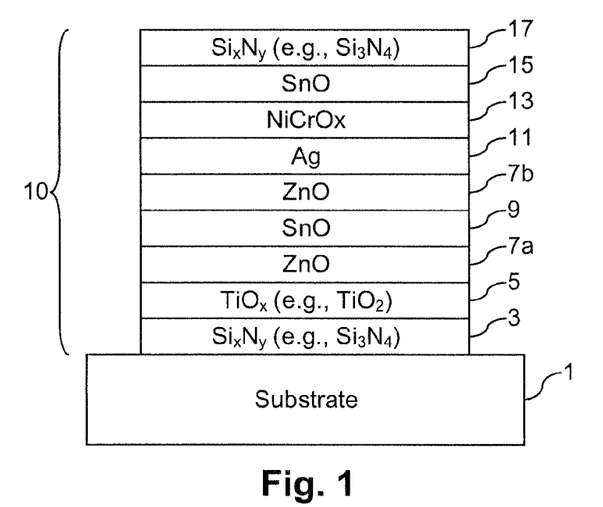
FIG. 1 is a cross-sectional view of a coated article according to an example embodiment of this invention.

Referring now more particularly to the drawings in which like reference numerals indicate like parts throughout the several views, FIG. 1 is a cross-sectional view of a coated article according to an example embodiment of this invention. The coated article includes substrate 1 (e.g., clear, green, bronze, or blue-green glass substrate from about 1.0 to 10.0 mm thick, more preferably from about 1.0 mm to 5.0 mm thick, with an example thickness being about 3 mm) and low-E coating (or layer system) 10 provided, either directly or indirectly, on the substrate 1. The coating (or layer system) 10 includes, for example, bottom dielectric silicon nitride based and/or inclusive layer 3 which may be $Si_3N_4$ (which may or may not be doped with other material(s) such as aluminum in certain example instances) of the Si-rich type for haze reduction, or of any other suitable stoichiometry silicon nitride in different embodiments of this invention; a dielectric high index layer 5, which may include titanium oxide (e.g., $TiO_2$ or other suitable stoichiometry); and first and second dielectric seed layers comprising zinc oxide 7a and 7b, that are split by a tin oxide inclusive dielectric "glue" layer 9; a conductive and preferably metallic infrared (IR) reflecting layer 11, which may be a silver-based layer; a contact layer including Ni and/or Cr 13, which may be oxided and/or nitrided, a second layer comprising tin oxide 15, and an outer-most protective layer 17 comprising silicon nitride. The dielectric high index layer 5 may be fully oxidized or sub-stoichiometric in different example embodiments. The second seed layer comprising zinc oxide 7b and/or the contact layer including Ni and/or Cr 13 may directly contact the IR reflecting layer 11.

While various thicknesses and materials may be used in layers in different embodiments of this invention, example thicknesses and materials for the respective sputter-deposited layers on the glass substrate 1 in the FIG. 1 embodiment are as follows, from the glass substrate outwardly:

TABLE 1

| Material | Preferred Thickness (Å) | More Preferred Thickness (Å) | Example Thickness 1 (Å) | Example Thickness 2 (Å) |
| --- | --- | --- | --- | --- |
| $Si_xN_y$ | 1-500 | 100-300 | 160 | 160 |
| $TiO_x$ | 75-125 | 85-115 | 100 | 100 |
| ZnO | 35-75 | 40-70 | 60 | 50 |
| SnO | 35-200 | 50-135 | 100 | 70 |
| ZnO | 30-200 | 40-130 | 60 | 100 |
| Ag | 60-110 | 70-100 | 85 | 85 |
| NiCrOx | 20-40 | 23-37 | 30 | 30 |
| SnO | 150-275 | 170-255 | 220 | 200 |
| $Si_xN_y$ | 1-1000 | 100-500 | 220 | 250 |

In certain example embodiments, the split layers may have matching or substantially matching thicknesses. For instance, the thicknesses of the split layers may differ by no more than 15% in certain example instances, no more than 10% in other example instances, and no more than 3-5% in yet other example instances. This is the case with Example 1 above, but is not the case with Example 2 above.

Figure 2:
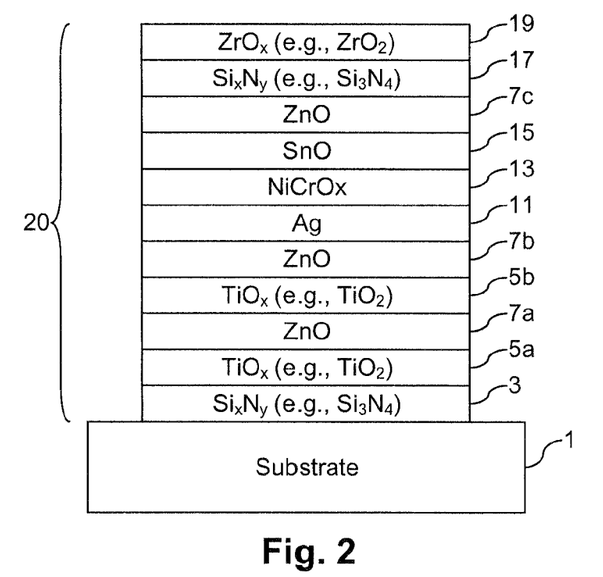
FIG. 2 is a cross-sectional view of a coated article according to another example embodiment of this invention.

FIG. 2 is a cross-sectional view of a coated article according to another example embodiment of this invention. FIG. 2 is similar to FIG. 1 in that it includes a low-E coating (or layer system) 20 provided, either directly or indirectly, on a substrate 1. As with the FIG. 1 embodiment, FIG. 2 includes for example, bottom dielectric silicon nitride based and/or inclusive layer 3 and a dielectric high index layer 5a, which may include titanium oxide (e.g., $TiO_2$ or other suitable stoichiometry). However, as shown in FIG. 2, the first and second dielectric seed layers comprising zinc oxide 7a and 7b are split by a layer comprising titanium oxide (e.g., $TiO_2$ or other suitable stoichiometry) 5b. Another way of thinking about this, however, is that the lower dielectric high index layer comprising titanium oxide 5 is split into two sub-layers (5a and 5b) by a first layer comprising zinc oxide 7a. Regardless of the way that this is thought of, IR reflecting layer 11, which may be a silver-based layer; a contact layer including Ni and/or Cr 13, which may be oxided and/or nitrided; a layer comprising tin oxide 15; and a second silicon nitride based layer 17, may be provided above the IR reflecting layer 11 as in FIG. 1. However, a third zinc oxide inclusive layer 7c may be interposed between the layer comprising tin oxide 15 and the silicon nitride based layer 17. An optional zirconium oxide inclusive top coat 19 is shown as an outer-most layer (and thus above the silicon nitride based layer 17) in FIG. 2. This zirconium oxide inclusive top coat 19 may provide further durability improvements.

While various thicknesses and materials may be used in layers in different embodiments of this invention, example thicknesses and materials for the respective sputter-deposited layers on the glass substrate 1 in the FIG. 2 embodiment are as follows, from the glass substrate outwardly:

TABLE 2

| Material | Preferred Thickness (Å) | More Preferred Thickness (Å) | Example Thickness 1 (Å) | Example Thickness 2 (Å) |
|---|---|---|---|---|
| $Si_xN_y$ | 1-500 | 10-300 | 156 | 156 |
| $TiO_x$ | 15-50 | 30-40 | 33 | 35 |
| ZnO | 70-200 | 95-125 | 114 | 110 |
| $TiO_x$ | 15-50 | 30-40 | 33 | 35 |
| ZnO | 70-200 | 95-125 | 114 | 110 |
| Ag | 70-120 | 80-100 | 90 | 90 |
| NiCrOx | 1-100 | 10-50 | 30 | 30 |
| SnO | 110-150 | 115-145 | 130 | 130 |
| ZnO | 70-200 | 95-125 | 109 | 109 |
| $Si_xN_y$ | 115-185 | 125-155 | 140 | 140 |
| $ZrO_x$ | 1-200 | 10-80 | 40 | 40 |

Figure 3:
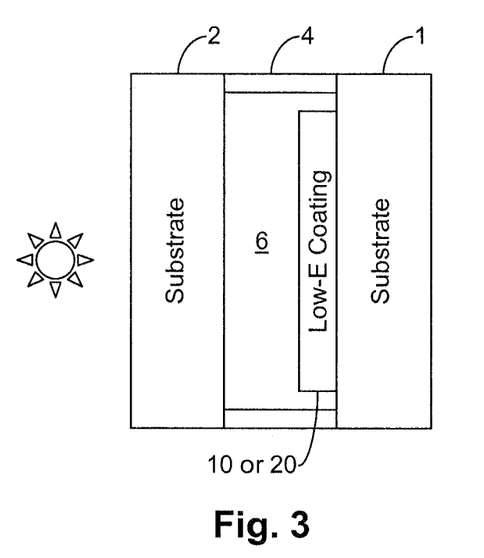
FIG. 3 is a cross-sectional view of an IG unit according to an example embodiment of this invention.

In monolithic instances, the coated article includes only one glass substrate 1 as illustrated in FIGS. 1 and 2. However, monolithic coated articles herein may be used in devices such as laminated vehicle windshields, IG window units, and the like. As for IG window units, an IG window unit may include two spaced apart glass substrates. An example IG window unit is illustrated and described, for example, in U.S. Pat. Nos. 7,189,458, 6,632,491; 6,014,872; 5,800,933; 5,784,853; and 5,514,476, and also U.S. Publication No. 2007/0128449, the disclosures of which are hereby incorporated herein by reference. An example IG window unit may include, for example, the coated glass substrate 1 shown in FIG. 1 or in FIG. 2 coupled to another glass substrate via spacer(s), sealant(s) or the like, with a gap being defined therebetween. This gap between the substrates in IG unit embodiments may in certain instances be filled with a gas such as argon (Ar). An example IG unit may comprise a pair of spaced apart clear glass substrates each about 1-10 mm (e.g., 3 or 6 mm) thick, one of which is coated with the coating 10 or the coating 20 described herein in certain example instances, where the gap between the substrates may be from about 5 to 30 mm, more preferably from about 10 to 20 mm, and most preferably about 14 mm. In certain example instances, the coating 10 or the coating 20 may be provided on the interior surface of either substrate facing the gap, however in preferred embodiments the coating 10 or the coating 20 is provided on the interior surface of the outer glass substrate 1 as shown in FIG. 3. An example IG window unit is also shown in FIG. 3 and may include, for example, the coated glass substrate 1 shown in FIGS. 1-2 coupled to another glass substrate 2 via spacer(s), sealant(s) or the like 4 with a gap 6 being defined therebetween. This gap 6 between the substrates in IG unit embodiments may in certain instances be filled with a gas such as argon (Ar). The gap 6 may or may not be at a pressure less than atmospheric in different embodiments of this invention.

In certain cases, the example layer stack shown in FIG. 1 may have the following performance characteristics when used in monolithic and IG unit applications:

TABLE 3

| Property | Preferred | More Preferred | Example |
|---|---|---|---|
| Monolithic | | | |
| T Y | >70 | >85 | 89.2 |
| T a* | −2.1-0.9 | −1.6-0.4 | −0.6 |
| T b* | −0.6-2.4 | −0.1-1.9 | 0.9 |
| R (glass side) Y | <15 | <10 | 6.6 |
| R (glass side) a* | −4.5--1.5 | −4--2 | −3.0 |
| R (glass side) b* | −6.1--3.1 | −5.6--3.6 | −4.6 |
| R (film side) Y | <15 | <10 | 5.9 |
| R (film side) a* | −4.6--1.6 | −4.1--2.1 | −3.1 |
| R (film side) b* | −4.3--1.3 | −3.8--1.8 | −2.8 |
| IGU | | | |
| T Y | >50 | >70 | 80.9 |
| T a* | −2.8-0.2 | −2.3--0.3 | −1.3 |
| T b* | −0.6-2.4 | −0.1-1.9 | 0.9 |
| R (out) Y | 11.4-14.4 | 11.9-13.9 | 12.9 |
| R (out) a* | −3.3--0.3 | −2.8--0.8 | −1.8 |
| R (out) b* | −3.6--0.6 | −3.1--1.1 | −2.1 |
| R (in) Y | 11.5-14.5 | 12-14 | 13.0 |
| R (in) a* | −3.5--0.5 | −3--1 | −2.0 |
| R (in) b* | −4.5--1.5 | −4--2 | −3.0 |
| Winter U-Factor (night-time) | 0.1-0.5 | 0.20-0.29 | 0.273 |
| Summer U-Factor (day-time) | 0.10-0.5 | 0.20-0.29 | 0.25 |
| Summer Shading Coefficient (SC) | 0.6-0.9 | 0.7-0.9 | 0.8 |
| Summer SHGC | 0.20-0.90 | 0.40-0.80 | 0.697 |
| Summer Relative Heat Gain | 121-187 | 142-185 | 164 |

In certain cases, the example layer stack shown in FIG. 2 may have the following performance characteristics when used in monolithic and IG unit applications:

TABLE 4

| Property | Preferred | More Preferred | Example 1 | Example 2 |
|---|---|---|---|---|
| Monolithic | | | | |
| T Y | >70 | >85 | 90.3 | |
| T a* | −2.55-0.45 | −2.05--0.05 | −1.05 | |
| T b* | −0.82-2.18 | −0.32-1.68 | 0.68 | |
| R (glass side) Y | <15 | <10 | 5.3 | |
| R (glass side) a* | −2.25-0.75 | −1.75-0.25 | −0.75 | |
| R (glass side) b* | −2.99-0.01 | −2.49--0.49 | −1.49 | |
| R (film side) Y | <15 | <10 | 6.0 | |
| R (film side) a* | −2.42-0.58 | −1.92-0.08 | −0.92 | |
| R (film side) b* | −2.97-0.03 | −2.47--0.47 | −1.47 | |
| IGU | | | | |
| T Y | >50 | >70 | 82.1 | 82.2 |
| T a* | −3.07--0.07 | −2.57--0.57 | −1.57 | −1.68 |
| T b* | −0.75-2.25 | −0.25-1.75 | 0.75 | −0.70 |

TABLE 4-continued

| Property | Preferred | More Preferred | Example 1 | Example 2 |
|---|---|---|---|---|
| R (out) Y | <20 | <16 | 12.6 | 12.8 |
| R (out) a* | −2.23-0.77 | −1.73-0.27 | −0.73 | −0.73 |
| R (out) b* | −2.55-0.45 | −2.05-−0.05 | −1.05 | −1.36 |
| R (in) Y | <20 | <16 | 12.7 | 12.9 |
| R (in) a* | −2.79-0.21 | −2.29-−0.29 | −1.29 | −1.27 |
| R (in) b* | −2.37-0.63 | −1.87-0.13 | −0.87 | −1.09 |
| SHGC | | | | |
| Out→In | 0.58-0.79 | 0.61-0.76 | 0.686 | 0.686 |
| In→Out | 0.55-0.76 | 0.58-0.72 | 0.655 | 0.653 |
| SC | | | | |
| Out→In | 0.66-0.91 | 0.70-0.87 | 0.788 | 0.789 |
| In→Out | 0.64-0.87 | 0.67-0.83 | 0.753 | 0.751 |
| Light-to-solar gain | | | | |
| Out→In | 1.02-1.38 | 1.08-1.32 | 1.2 | 1.2 |
| In→Out | 1.07-1.45 | 1.13-1.39 | 1.26 | 1.26 |
| U-Factor | | | | |
| Out→In | 0.21-0.29 | 0.22-0.28 | 0.251 | 0.26 |
| In→Out | 0.21-0.29 | 0.22-0.28 | 0.251 | 0.26 |

Thermal performance for the examples above is provided in connection with the NFRC 2001 standard. In Table 3 and Example 1 of Table 4, the IGU configuration involved a first 2.3 mm clear glass substrate, and a second 4.0 mm Extra Clear glass substrate provided by the assignee of the instant application, with a 12.0 mm gap filled with Ar. In Example 2 of Table 4, the IGU configuration involved first and second Extra Clear glass substrates separated by an Ar-filled 16.0 mm gap. The low-E coatings in the above examples were provided on surface 3 of the IG unit (although other configurations may involve the low-E coating being disposed on one of the other surfaces such as, for example, surface 2). Also, other gasses may be used in different embodiments including Nobel gasses such as Kr, Xe, and/or the like. These gasses may completely or partially fill the gaps between adjacent substrates (e.g., 90% Ar, remainder $O_2$ or atmosphere, etc.).

The example performance data described above may be the same or substantially the same for as-deposited and/or heat treated embodiments.

The silicon nitride inclusive layers 3 and/or 17 may, among other things, improve heat-treatability of the coated articles, e.g., such as thermal tempering or the like. The silicon nitride of these layers may be of the stoichiometric type (i.e., $Si_3N_4$), or alternatively of the Si-rich type in different embodiments of this invention. For example, Si-rich silicon nitride combined with zinc oxide and/or tin oxide under a silver based IR reflecting layer may permit the silver to be deposited (e.g., via sputtering or the like) in a manner that causes its sheet resistance to be lessened compared to if certain other material(s) were under the silver. Moreover, the presence of free Si in a Si-rich silicon nitride inclusive layer 3 may allow certain atoms such as sodium (Na) that migrate outwardly from the glass 1 during HT to be more efficiently stopped by the Si-rich silicon nitride inclusive layer before they can reach the silver and damage the same. Thus, it is believed that the Si-rich $Si_xN_y$ can reduce the amount of damage done to the silver layer(s) during HT in certain example embodiments of this invention thereby allowing sheet resistance ($R_s$) to decrease or remain about the same in a satisfactory manner. In certain example embodiments, when Si-rich silicon nitride is used in layer 3 and/or 17, the Si-rich silicon nitride layer as deposited may be characterized by $Si_xN_y$ layer(s), where x/y may be from 0.76 to 1.5, more preferably from 0.8 to 1.4, still more preferably from 0.85 to 1.2. Moreover, in certain example embodiments, before and/or after HT the Si-rich $Si_xN_y$ layer(s) may have an index of refraction "n" of at least 2.05, more preferably of at least 2.07, and sometimes at least 2.10 (e.g., 632 nm) (note: stoichiometric $Si_3N_4$ which may also be used has an index "n" of 2.02-2.04). In certain example embodiments, it has surprisingly been found that improved thermal stability is especially realizable when the Si-rich $Si_xN_y$ layer(s) as deposited has an index of refraction "n" of at least 2.10, more preferably of at least 2.20, and most preferably from 2.2 to 2.4.

Any and/or all of the silicon nitride layers discussed herein may be doped with other materials such as stainless steel or aluminum in certain example embodiments of this invention. For example, any and/or all silicon nitride layers discussed herein may optionally include from about 0-15% aluminum, more preferably from about 1 to 10% aluminum, in certain example embodiments of this invention. The silicon nitride may be deposited by sputtering a target of Si or SiAl in certain embodiments of this invention. Oxygen may also be provided in certain instances in one or more of the silicon nitride layers. While silicon nitride is a preferred material for layers 3 and 17 in certain example embodiments of this invention, it will be recognized that other materials instead or in addition may be used for one or more of these layers in alternative embodiments of this invention.

Infrared (IR) reflecting layer 11 is preferably substantially or entirely metallic and/or conductive, and may comprise or consist essentially of silver (Ag), gold, or any other suitable IR reflecting material. IR reflecting layer 11 helps allow the coating to have low-E and/or good solar control characteristics. The IR reflecting layer may, however, be slightly oxidized in certain embodiments of this invention.

The upper contact layer 13 may be of or include nickel (Ni) oxide, chromium/chrome (Cr) oxide, or a nickel alloy oxide such as nickel chrome oxide ($NiCrO_x$), or other suitable material(s), in certain example embodiments of this invention. The use of, for example, $NiCrO_x$ in layer 13 allows durability to be improved. The $NiCrO_x$ of layer 13 may be fully (or substantially fully) oxidized in certain embodiments of this invention (fully stoichiometric), or may only be partially oxidized. In certain instances, the $NiCrO_x$ layer 13 may be at least about 50% oxidized. It also may or may not be oxidation graded in different embodiments of this invention. Oxidation grading means that the degree of oxidation in the layer changes in the thickness of the layer so that for example a contact layer may be graded so as to be less oxidized at the contact interface with the immediately adjacent IR reflecting layer 11 than at a portion of the contact layer further or more/most distant from the immediately adjacent IR reflecting layer 11. Contact layer 13 (e.g., of or including an oxide of Ni and/or Cr) may or may not be continuous in different embodiments of this invention across substantially the entire IR reflecting layer 11.

Dielectrics layer 9 and 15 may be of or include tin oxide in certain example embodiments of this invention. However, as with other layers herein, other materials may be used in different instances.

The zinc oxide of layers 7a, 7b, and/or 7c may contain other materials as well such as Al (e.g., to form $ZnAlO_x$) and/or tin. For example, in certain example embodiments of this invention, one or more of zinc oxide based layers 7a, 7b, and/or 7c may be doped with from about 1 to 10% Al, more preferably from about 1 to 5% Al, and most preferably about 1 to 4% Al.

Dielectric layer 17 may be an overcoat in certain example instances. Optionally, other layers (e.g., a layer of or including zirconium oxide) may be provided above layer 17. Layer 17 is provided for durability purposes, and to protect the underlying layers during heat treatment and/or environmental use. In certain example embodiments, layer 17 may have an index of refraction (n) of from about 1.9 to 2.2, more preferably from about 1.95 to 2.05.

Other layer(s) below or above the illustrated coating may also be provided. Thus, while a layer, layer system, coating, or the like, may be said to be "on" or "supported by" a substrate, layer, layer system, coating, or the like, other layer(s) may be provided therebetween. Thus, for example, the coatings of FIGS. 1 and 2 may be considered "on" and "supported by" the substrate 1 even if other layer(s) are provided between layer 3 and substrate 1. Moreover, certain layers of the illustrated coating may be removed in certain embodiments, while other non-illustrated layers may be added between the various layers in different example embodiments, or the various layer(s) may be split with other layer(s) added between the split sections in other embodiments of this invention without departing from the overall spirit of certain embodiments of this invention.

As explained above, one aspect of certain example embodiments relates to the inventors' discovery that increasing the number of interfaces in a layer stack promotes durability and corrosion resistance. For instance, increasing the number of layers in a dielectric layer stack from two to three or more with the total thickness of the dielectric layers being kept substantially the same has been found to result in superior durability.

The improvements resulting from splitting layers and/or adding additional interfaces can be manifest in a number of different ways. For example, oxygen tends to migrate through the coatings at different times during manufacturing such as, for example, when sputtering is performed in a reactive environment, when high temperature processes are involved, during heat treatment, etc. However, oxygen tends to become trapped at interfaces. Thus, providing more interfaces provides more chances for oxygen to become trapped. As a result, the silver may be better protected from inadvertent oxidation. Similar comments also apply with respect to sodium migration, which is known to occur over time based on the sodium that oftentimes is present in soda-lime-silicate glass substrates. That is, sodium tends to become trapped at interfaces, and the increased number of provide more chances for the migrating sodium to become trapped. The resultant trapping of oxygen and/or other potential contaminants also may help keep haze low, particularly after heat treatment.

As another example, it has been observed that materials such as, for example, titanium oxide and tin oxide, do not always grow homogenously. Thus, while coatings oftentimes are classified as being either crystalline or amorphous, the inventors of the instant application have observed that these materials sometimes grow heterogeneously such that a single coating may have both crystal growths and amorphous regions. Furthermore, even in a generally crystalline growth regime, individual crystals have been observed as growing at different speeds. These traits work together and sometimes result in a fairly rough surface. However, the inventors have discovered that by splitting layers and/or introducing further layers, the crystal formation is started and stopped rapidly, which has been found to promote more homogenous, amorphous and highly smooth layer growth. Smoother underlying layers may, in turn, facilitate better silver growth. Smoother layers also may reduce the net compressive forces in the layer stack system, thereby improving durability.

Still another example advantage pertains to the altering of material interactions caused by the increased number of interfaces. More particularly, the altering of the material interactions allows for some "slipping" as between adjacent layers, e.g., as the coating is being formed, during exposure to different environmental conditions once manufactured and possibly installed, etc. This increased capacity for expansion and contraction thus improves the overall thermal stability of the layer stack system.

It is noted that the example low-E coatings described herein may be used in connection with so-called triple IGUs. See, for example, U.S. Application Ser. No. 13/324,267, filed on Dec. 13, 2011, the entire contents of which is incorporated herein by reference. It also is noted that the example low-E coatings described herein may be used in connection with vacuum insulated glass (VIG) units. Vacuum IG units are known in the art. For example, see U.S. Pat. Nos. 5,664,395, 5,657,607, and 5,902,652, the disclosures of which are all hereby incorporated herein by reference.

The U-factor (or U-value) refers to a measure of heat gain or heat loss through glass due to the differences between indoor and outdoor temperatures. NFRC winter nighttime U-values are based on an outdoor temperature of 0 degrees F. (−17.8 degrees C.), an indoor temperature of 70 degrees F. (21 degrees C.) and a 12.3 mph (19.8 km/h) outdoor air velocity. NFRC summer daytime U-values are based on an outdoor temperature of 89 degrees F. (32 degrees C.), an indoor temperature of 75 degrees F. (24 degrees C.), a 6.2 mph (10.1 km/h) outdoor air velocity, and a solar intensity of 248 BTU/hr/ft$^2$/degrees F (782 W/m$^2$).

The shading coefficient refers to the ratio of solar heat gain through a specific type of glass that is relative to the solar heat gain through a 3 mm clear substrate glass under identical conditions. As the shading coefficient number decreases, heat gain is reduced, which generally is indicative of a better performing product.

Solar Heat Gain Coefficient (SHGC) represents the portion of directly transmitted and absorbed solar energy that enters into the building's interior. The higher the SHGC, the higher the heat gain.

Relative Heat Gain (RHG) represents the amount of heat gained through glass taking into consideration the effects U-value and shading coefficient. Using the NFRC standard, and for the English system, relative heat gain is calculated according to the following formula: RHG=(Summer U-value×14° F.)+(Shading Coefficient×200).

Optical performance as reported herein refers to measurements with an Ill. C/2° observer, unless otherwise noted.

In certain example embodiments of this invention, there is provided a heat treatable coated article, comprising a multi-layer thin film coating supported by a glass substrate. The coating comprises, in order moving away from the substrate: a first silicon-based layer; a first dielectric layer; a second dielectric layer split by a third dielectric layer so as to form first and second portions of the second dielectric layer; a metallic or substantially metallic infrared (IR) reflecting layer over and directly contacting the second portion of the second dielectric layer; an upper contact layer comprising an oxide of Ni and/or Cr directly over and contacting the IR reflecting layer; a fourth dielectric layer; and a second silicon-based layer. The third dielectric layer comprises either titanium oxide or tin oxide.

In addition to the features of the previous paragraph, in certain example embodiments, the first dielectric layer may be a high refractive index layer comprising an oxide or sub-oxide of titanium.

In addition to the features of either of the two prior paragraphs, in certain example embodiments, the third and fourth dielectric layers may comprise tin oxide.

In addition to the features of the previous paragraph, in certain example embodiments, the second dielectric layer may comprise zinc oxide.

In addition to the features of the previous paragraph, in certain example embodiments, the second layer may be split such that the parts thereof have thicknesses that vary by no more than 5% of one another.

In addition to the features of any one of the previous five paragraphs, in certain example embodiments, the first and second silicon-based layers may each comprise silicon nitride, the first dielectric layer may comprise titanium oxide, the second dielectric layer may comprise zinc oxide, the third and fourth dielectric layers may each comprise tin oxide, and the IR reflecting layer may comprise Ag.

In addition to the features of any one of the previous six paragraphs, in certain example embodiments, a fifth dielectric layer may be interposed between the fourth dielectric layer and the second silicon-based layer.

In addition to the features of the previous paragraph, in certain example embodiments, the first and third dielectric layers may each comprise titanium oxide, and the second and fifth dielectric layers may each comprise zinc oxide.

In addition to the features of the previous paragraph, in certain example embodiments, the two portions of the split second dielectric layer and the fifth dielectric layer may each have thicknesses that vary from one another by no more than 5%.

In addition to the features of the previous paragraph, in certain example embodiments, the first and third dielectric layers may have thicknesses that vary from one another by no more than 5%.

In addition to the features of any one of the previous ten paragraphs, in certain example embodiments, a topcoat comprising zirconium oxide may be provided.

In certain example embodiments, an insulated glass (IG) unit is provided. The coated article of any one of the previous 11 paragraphs may be provided. A second substrate may be substantially parallel to and spaced apart from the coated article via a spacer system.

In certain example embodiments of this invention, there is provided a method of making a heat treatable coated article comprising a multilayer thin film coating supported by a glass substrate. A first silicon-based layer is disposed on the glass substrate. A first dielectric layer is disposed, directly or indirectly, on the first silicon-based layer. The method further includes starting to dispose a second dielectric layer, directly or indirectly, on the first dielectric layer; interrupting the disposing of the second dielectric layer and disposing a third dielectric layer; and resuming the disposing of the second dielectric layer on the third dielectric layer, such that the interruption and resumption in the disposing of the second dielectric layer results in the formation of first and second portions of the second dielectric layer, with each said portion being substantially homogenous and amorphous. A metallic or substantially metallic infrared (IR) reflecting layer is disposed directly over and contacting the second portion of the second dielectric layer. An upper contact layer comprising an oxide of Ni and/or Cr is disposed directly over and contacting the IR reflecting layer. A fourth dielectric layer is disposed, directly or indirectly, on the upper contact layer. A second silicon-based layer is disposed, directly or indirectly, on the fourth dielectric layer. The third dielectric layer comprises either titanium oxide or tin oxide.

In addition to the features of the previous paragraph, in certain example embodiments, the first dielectric layer may be a high refractive index layer comprising an oxide or sub-oxide of titanium.

In addition to the features of either of the two prior paragraphs, in certain example embodiments, the third and fourth dielectric layers may comprise tin oxide.

In addition to the features of the previous paragraph, in certain example embodiments, the second dielectric layer may comprise zinc oxide.

In addition to the features of the previous paragraph, in certain example embodiments, the second layer may be split such that the parts thereof have thicknesses that vary by no more than 5% of one another.

In addition to the features of any one of the previous five paragraphs, in certain example embodiments, the first and second silicon-based layers may each comprise silicon nitride, the first dielectric layer may comprise titanium oxide, the second dielectric layer may comprise zinc oxide, the third and fourth dielectric layers may each comprise tin oxide, and the IR reflecting layer may comprise Ag.

In addition to the features of any one of the previous six paragraphs, in certain example embodiments, a fifth dielectric layer may be located between the fourth dielectric layer and the second silicon-based layer.

In addition to the features of the previous paragraph, in certain example embodiments, the first and third dielectric layers may each comprise titanium oxide, and the second and fifth dielectric layers may each comprise zinc oxide.

In addition to the features of the previous paragraph, in certain example embodiments, the two portions of the split second dielectric layer and the fifth dielectric layer may each have thicknesses that vary from one another by no more than 5%.

In addition to the features of the previous paragraph, in certain example embodiments, the first and third dielectric layers may have thicknesses that vary from one another by no more than 5%.

In addition to the features of any one of the previous ten paragraphs, in certain example embodiments, the coated article may be heat treated.

In addition to the features of any one of the previous 11 paragraphs, in certain example embodiments, a topcoat comprising zirconium oxide may be disposed as an outermost layer of the coated article.

In addition to the features of any one of the previous 12 paragraphs, in certain example embodiments, each layer may be formed via sputtering in a reactive environment of oxygen and/or nitrogen.

In certain example embodiments, a method of making an insulated glass (IG) unit may be provided. The method of any one of the previous 13 paragraphs may be provided. A second substrate may be provided in substantially parallel, spaced apart relation to the coated article in making the IG unit.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:
1. A heat treatable coated article, comprising a multilayer thin film coating supported by a glass substrate, the coating comprising, in order moving away from the substrate:
   a first silicon-based layer;
   a first dielectric layer;
   a second dielectric layer split by a third dielectric layer so as to form first and second portions of the second dielectric layer;

a metallic or substantially metallic infrared (IR) reflecting layer comprising silver over and directly contacting the second portion of the second dielectric layer, wherein the coating contains only one IR reflecting layer comprising silver so that each of the first silicon-based layer, the first dielectric layer, the second dielectric layer and the third dielectric layer are all located between the glass substrate and the IR reflecting layer;

an upper contact layer comprising an oxide of Ni and/or Cr directly over and contacting the IR reflecting layer;

a fourth dielectric layer; and a second silicon-based layer, wherein the third dielectric layer comprises either titanium oxide or tin oxide.

2. The coated article of claim 1, wherein the first dielectric layer is a high refractive index layer comprising an oxide or sub-oxide of titanium.

3. The coated article of claim 1, wherein the third and fourth dielectric layers comprise tin oxide.

4. The coated article of claim 3, wherein the second dielectric layer comprises zinc oxide.

5. The coated article of claim 4, wherein the second layer is split such that the parts thereof have thicknesses that vary by no more than 5% of one another.

6. The coated article of claim 1, wherein the first and second silicon-based layers each comprise silicon nitride, the first dielectric layer comprises titanium oxide, the second dielectric layer comprises zinc oxide, the third and fourth dielectric layers each comprise tin oxide, and the IR reflecting layer comprises Ag.

7. The coated article of claim 1, further comprising a fifth dielectric layer interposed between the fourth dielectric layer and the second silicon-based layer.

8. The coated article of claim 7, wherein:
the first and third dielectric layers each comprise titanium oxide, and
the second and fifth dielectric layers each comprise zinc oxide.

9. The coated article of claim 8, wherein the two portions of the split second dielectric layer and the fifth dielectric layer each have thicknesses that vary from one another by no more than 5%.

10. The coated article of claim 9, wherein the first and third dielectric layers have thicknesses that vary from one another by no more than 5%.

11. The coated article of claim 1, further comprising a topcoat comprising zirconium oxide.

12. An insulated glass (IG) unit, comprising:
the coated article of claim 1; and
a second substrate, substantially parallel to and spaced apart from, the coated article via a spacer system.

13. A heat treatable coated article, comprising a multilayer thin film coating supported by a glass substrate, the coating comprising, in order moving away from the substrate:
a first silicon-based layer;
a first dielectric layer;
a second dielectric layer split by a third dielectric layer so as to form first and second portions of the second dielectric layer;
a metallic or substantially metallic infrared (IR) reflecting layer over and directly contacting the second portion of the second dielectric layer;
an upper contact layer comprising an oxide of Ni and/or Cr directly over and contacting the IR reflecting layer;
a fourth dielectric layer; and
a second silicon-based layer,
wherein the third dielectric layer comprises either titanium oxide or tin oxide,
a fifth dielectric layer interposed between the fourth dielectric layer and the second silicon-based layer,
wherein the first and third dielectric layers each comprise titanium oxide, and the second and fifth dielectric layers each comprise zinc oxide.

14. The coated article of claim 13, wherein the two portions of the split second dielectric layer and the fifth dielectric layer each have thicknesses that vary from one another by no more than 5%.

15. The coated article of claim 13, wherein the first and third dielectric layers have thicknesses that vary from one another by no more than 5%.

16. A heat treatable coated article, comprising a multilayer thin film coating supported by a glass substrate, the coating comprising, in order moving away from the substrate:
a first silicon-based layer;
a first dielectric layer;
a second dielectric layer split by a third dielectric layer so as to form first and second portions of the second dielectric layer;
a metallic or substantially metallic infrared (IR) reflecting layer comprising silver over and directly contacting the second portion of the second dielectric layer, wherein no other IR reflecting layer comprising silver is located between the glass substrate and said IR reflecting layer comprising silver, so that each of the first silicon-based layer, the first dielectric layer, the second dielectric layer and the third dielectric layer are all located between the glass substrate and said IR reflecting layer;
an upper contact layer directly over and contacting said IR reflecting layer;
a fourth dielectric layer; and
a second silicon-based layer,
wherein the third dielectric layer comprises either titanium oxide or tin oxide.

17. The coated article of claim 16, wherein the first dielectric layer is a high refractive index layer comprising an oxide or sub-oxide of titanium.

18. The coated article of claim 16, wherein the third and fourth dielectric layers comprise tin oxide.

19. The coated article of claim 16, wherein the second dielectric layer comprises zinc oxide.

20. The coated article of claim 16, wherein the second layer is split such that the parts thereof have thicknesses that vary by no more than 5% of one another.

21. The coated article of claim 16, wherein the coating contains only one IR reflecting layer comprising silver.

* * * * *